March 10, 1964 B. F. THOMAS 3,123,905
METHOD OF MAKING HONEYCOMB CORE
Filed Jan. 18, 1960 2 Sheets-Sheet 1
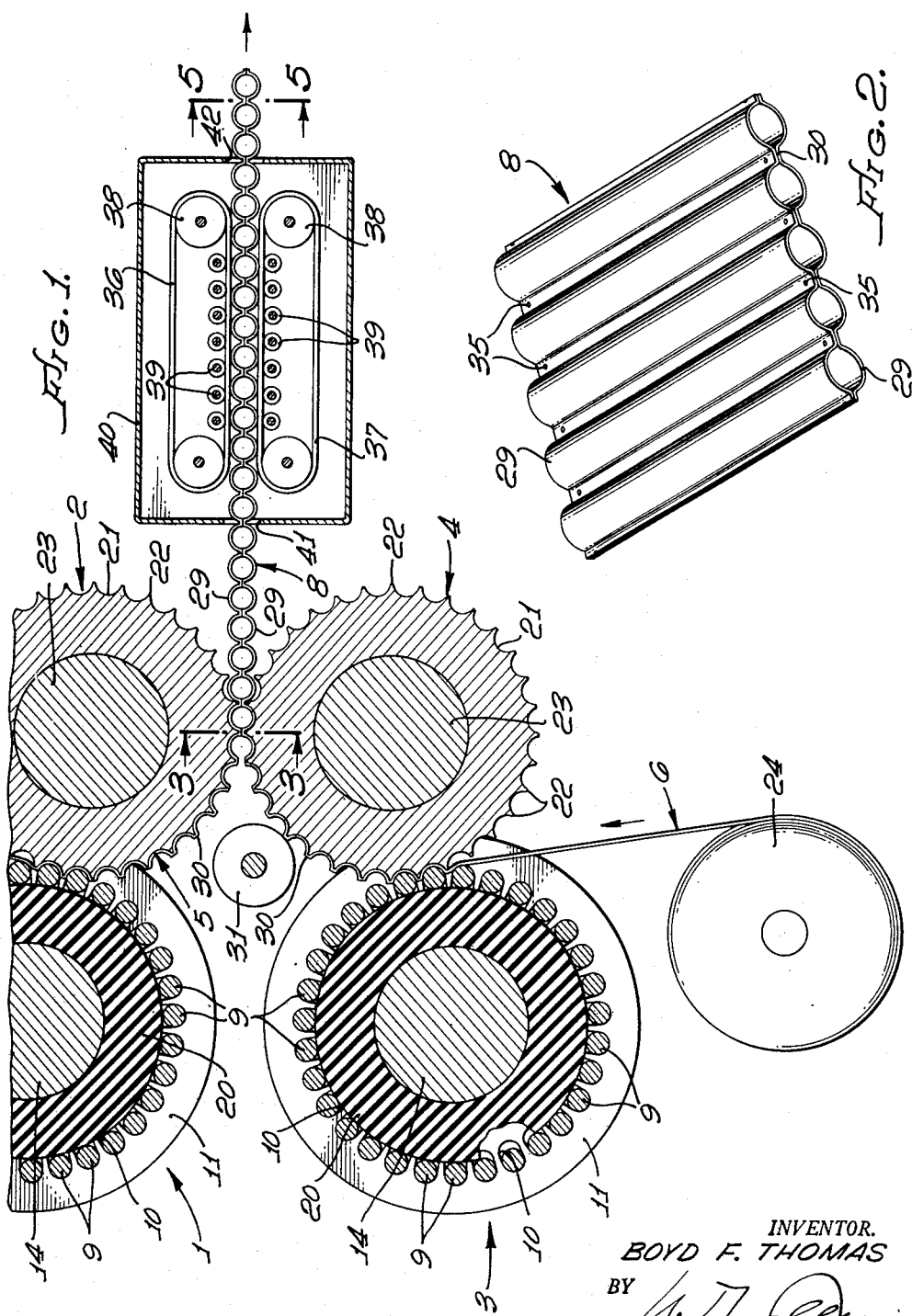
INVENTOR.
BOYD F. THOMAS
BY
ATTORNEY.

March 10, 1964  B. F. THOMAS  3,123,905
METHOD OF MAKING HONEYCOMB CORE
Filed Jan. 18, 1960  2 Sheets-Sheet 2
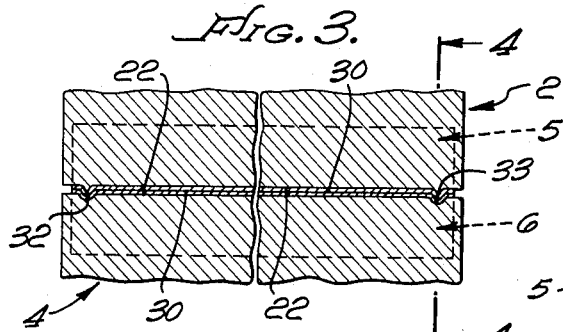
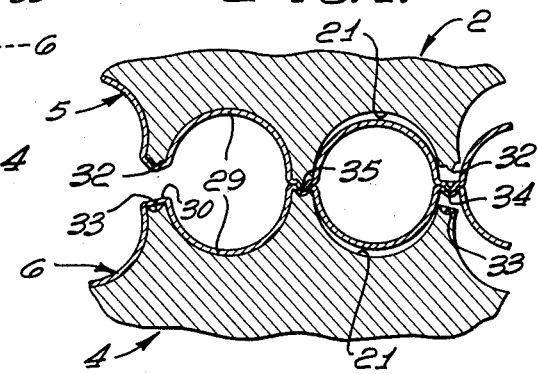
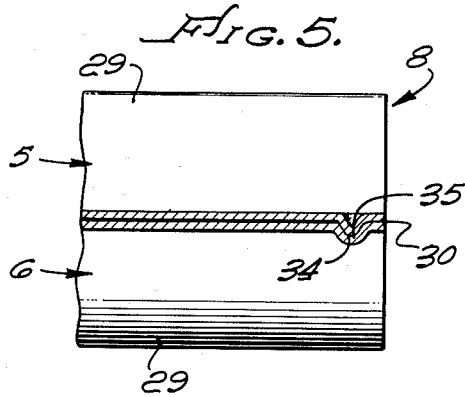
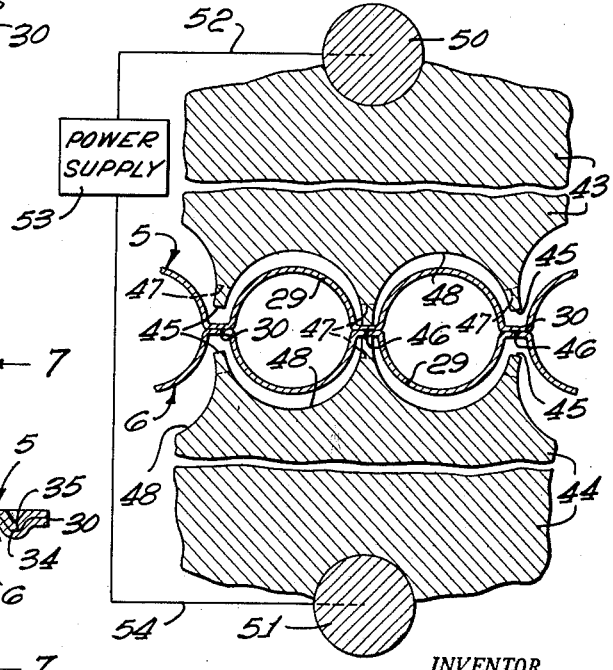
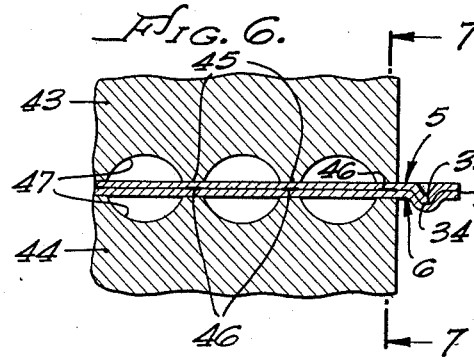
INVENTOR.
BOYD F. THOMAS
BY
ATTORNEY.

ated Mar. 10, 1964

3,123,905
METHOD OF MAKING HONEYCOMB CORE
Boyd F. Thomas, Pasadena, Calif., assignor to Young Spring & Wire Corporation, Detroit, Mich., a corporation of Michigan
Filed Jan. 18, 1960, Ser. No. 3,097
10 Claims. (Cl. 29—429)

This invention relates to a method of making a honeycomb core structure and more particularly to a method in which continuous sheets or strips of thin metal or foil are simultaneously shaped and then secured together to form a continuous honeycomb core for use in sandwich-type structures.

The method described herein may be accomplished by the apparatus described in my co-pending application Serial No. 2,972 entitled Apparatus for Forming Sheet Metal, filed January 18, 1960 and now Patent No. 3,091,836.

With the increasing demand for lightweight skin structures in aircraft and in missiles there has been a great amount of development relative to sandwich-type skin structures having honeycomb metal cores. One of the problems relating to honeycomb cores has been the extremely high cost of production and, accordingly, the present invention is directed to a method for making honeycomb core structures at reduced cost, faster and with high accuracy, and to a honeycomb core structure having a high strength-to-weight ratio.

The method for forming sheets used in honeycomb cores has been greatly simplified by the present invention. Precision ground cooperating rollers formed with complementary die surfaces have been used in the past to form each of the cooperating strips or sheets of a honeycomb core but have been subject to the rigid requirement of accurate alignment. Their effective lives have been shortened by wear which has been important because of the additional requirement of accuracy in the mating surfaces.

In the cooperating rollers constructed as a means to practice this invention, the roller with the re-entrant or recessed surface, which may be called the female roller, may be constructed as before. Its cooperating roller with the protruding die surfaces, which roller may be called the male roller, is constructed differently, and has a multiplicity of circumferentially spaced, axially-extending, accurately-shaped rods of desired cross-sectional configuration, each of which is resiliently supported radially for meshing with the female roller.

The use of individual replaceable rods greatly reduces the cost of making the male roller member as the need of accuracy in one large complicated integral unit is eliminated. The rods are fitted in slightly oversized holes in flanges on the ends of the roller so that any radially inwardly directed pressure will force them into contact with their resilient supporting means. The resilient means maintains the pressure between the two mating rollers without danger that the metal being formed will be damaged or sheared off because of a slight eccentricity or mismatch between the protrusions and the re-entrant portions of the two rollers. Two strips or sheets of metal after passing through the rollers are brought into a pressure contact with each other, as between the rollers having the re-entrant portions, where they may be secured together by welding, adhesives, brazing or tacking.

Accordingly, a primary object of the invention is to provide an improved method for forming sheet metal.

Another object of the invention is to provide a method for shaping metal sheets and connecting them together to form a honeycomb core.

Still another object of the invention is to provide a method for shaping metal with mating rollers in which the protruding die elements on the male roller are formed by replaceable rods.

A further object of the invention is to provide a method for shaping metal with self-aligning resiliently-mounted die elements which are adapted to compensate for misalignment and inaccuracy.

A still further object of the invention is to provide a method for corrugating paired continuous flat strips or sheets of thin metal and connecting them permanently into a honeycomb core having parallel transverse tubes.

Still another object of the invention is to provide a method for forming metal in a pair of cooperating rollers in which at least one of the rollers have accurately made shaping elements resiliently supported to permit radial movement against rigid shaping elements in the other roller.

These and other more specific objects will appear upon reading the following specification and claims and upon considering in connection therewith the attached drawings to which they relate.

Referring now to the drawings in which a preferred embodiment of the invention is illustrated:

FIGURE 1 is a cross-sectional view through apparatus for making a honeycomb core according to the invention;

FIGURE 2 is a perspective view of a honeycomb core made according to the invention;

FIGURE 3 is an enlarged fragmentary sectional view taken in the direction of the arrows 3—3 of FIGURE 1 and showing the engagement of modified rollers provided with indenting means for tacking the two sheets of formed metal together;

FIGURE 4 is a cross-sectional view taken along the line 4—4 of FIGURE 3;

FIGURE 5 is an enlarged fragmentary view showing the connected flat portions of the core having complementary projections and indentations made with the indenting means on the rollers shown in FIGURES 3 and 4;

FIGURE 6 is a fragmentary view similar to FIGURE 3 of additional rollers for spot welding the formed sheets to form the core; and FIGURE 7 is a cross-sectional view taken upon the line 7—7 of FIGURE 6.

Referring again to the drawings, two sets of mating rollers 1, 2 and 3, 4 are shown in FIGURE 1 in engagement to form two continuous sheets of metal 5 and 6, respectively, which after being formed are brought into contact with each other between rollers 2 and 4 to be joined into a single core element or member 8. Each of the rollers 1 and 3 have axially directed, circumferentially-spaced, separate protrusions formed on their exterior surfaces by rods 9 which may be cylindrical, hexagonal, elliptical or some other cross-sectional shape. The rods are secured tin the rollers in slightly oversized slot-shaped wells 10 in end flanges 11 which are removably secured to the ends of a central core portion 14. Extending from the opposite ends of cores 14 are bearing mounted shafts on which the rollers are mounted for rotation as shown in my aforementioned co-pending application. Encircling each core 14 and underlying the rods 9 is a resilient cylinder or sleeve 20 of rubber or other resilient material. The relationship is such that the rods 9 are urged resiliently to their outermost radial positions as permitted by the wells 10 and, as the rollers 1 and 3 roll in abutting contact with their cooperating rollers 2 and 4, respectively, the resilient sleeves force the rods against the sheet and enable them to engage their seating surfaces correcting and compensating for any inaccuracy or misalignment the wells 10 being so sized as to permit this.

The rollers 2 and 4 have flat spacing surfaces 22 between axialy directed, elongated re-entrant portions or grooves 21 of semicircular cross-section, each re-entrant portion being complementary to a mating protrusion 9. These rollers are fixedly mounted on spaced core members 23, the opposite ends of which are bearing mounted on shafts, not shown. The rollers 2 and 4 are driven at synchronous speeds by a motor or other driving means, not shown, connected in each instance to a drive shaft which is conventionally connected to the roller shafts. Rollers 1 and 3 are driven by the engagement of their rods 9 with the mating surface of the rollers 2 and 4, respectively.

Rolls of the thin metal sheets 5 and 6 are carried by rollers, as 24, from which they are fed to the forming rollers. After the sheets 5 and 6 are placed between the mating rollers 1, 2 and 3, 4, respectively, the rotation of the rollers 2 and 4 causes the metal to be continuously fed through the space between them to be formed as it is forced by successive rods 9 into corresponding complementary re-entrant female die structures 21, as shown in FIGURE 1. The formed sheets, having semi-circular surfaces 29 spaced by flat surfaces 30, remain temporarily in the re-entrant portions 21 and on the flat surfaces 22, respectively, as the rollers 2 and 4 rotate to continue to draw the unformed metal between the mating rollers.

As the rods 9 in each of the rollers 1 and 3 are radially displaceable in the slot-shaped wells 10 in the flanges 11 and are urged radially outwardly by the resilient sleeves 20, each is automatically adjustable to fit perfectly into a corresponding re-entrant portion 21 in the mating roller and is movable relative to the other rods. Accordingly, it is not necessary that the rollers in the present invention be made with the same precision and retained with the same accuracy of alignment as in earlier machines in which the male die members are immovable with respect to each other and to the re-entrant portions.

Another advantage of having the rods as individual members, rather than as integral parts of a solid roller, is that the rods and flanges can be removed and replaced with other rods and flanges of different sizes and contours in order to form metal of different thickness or into different shapes.

One method of securing the two sheets 5 and 6 together to form the core 8 is by brazing along their flat surfaces 30. As shown in FIGURE 1, a roller 31 is used to apply brazing compound to the flat surfaces of one of the sheets 6 as it moves past. Rollers 2 and 4 are aligned and spaced to cause the opposing spaced flat surfaces of sheets 5 and 6, formed on the spacers 22 between the re-entrant portions 21 of the respective rollers, to be brought into pressure contact with each other with the brazing compound between them. As the two sheets pass from between the rollers 2 and 4, it is necessary that they be held together by two conveyors 36, 37, each driven by a pair of rollers 38. The inner surfaces of the conveyors are supported by a plurality of idler rollers 39 so that they are in pressure contact with the core to hold it together. Surrounding conveyors 36 and 37 is a furnace 40 for fusing the brazing compound to the metal as the core passes through. Entrance passage 41 and exit passage 42 of the furnace are in alignment with the conveyors, and after the brazed core passes through the latter additional supporting means, such as another pair of conveyors, may be provided if needed to hold the sheets 5 and 6 together until the brazed connections have hardened.

To aid in holding the formed sheets 5 and 6 together before they are permanently secured, they may be tacked together along their edges in the manner shown in FIGURES 3 through 5. Axially and circumferentially spaced, pointed projections 32 are provided on the roller 2 which extend radially outwardly from the flat surfaces 22 between the re-entrant portions 21. To accommodate the projections 32, the mating roller 4 is provided with mating wells 33 in its flat surface 22. When the opposing flat surfaces 30 of the metal sheets 5 and 6 are brought together between the rollers 2 and 4 the projections 32 depress the metal of both sheets into wells 33 forming projections 34 on sheet 5 and indentations 35 in sheet 6 to tack the two sheets together. Tacking in this manner, adjacent each end of each pair of opposing flat surfaces 30 temporarily secures the sheets together and holds them in alignment while they are being permanently secured.

The same apparatus shown in FIGURE 1 and in FIGURES 3 through 5, except for the omission of the furnace 40, if desired, may be used to secure the two sheets 5 and 6 together by means of an adhesive. In this method the adhesive is applied by the roller 31 to the flat surfaces 30 in the same manner as the brazing compound and the aligned flat surfaces 30 are held in pressure relationship between the conveyors 36 and 37 until the adhesive sets.

Another method of securing the sheets 5 and 6 together permanently to form the core 8 is by spot welding. This may be accomplished by using the metal rollers 2 and 4 as the electrodes and by passing a conventional welding current through them intermittently or continuously depending upon the number of flat surfaces 30 to be welded together. When the cores are formed by welding, the roller 31, the conveyors 36 and 37, and the furnace 40 are not required.

Instead of welding sheets 5 and 6 by rollers 2 and 4, they may be welded by an additional pair of rollers 43 and 44, as shown in FIGURES 6 and 7, shaped generally like the rollers 2 and 4, which may be situated in the approximate position of the conveyors shown in FIGURE 1, in alignment with rollers 2 and 4. The welding circuit may be a conventional one having a power supply 53 connected on one side by lead 52 to shaft 50 of roller 43 and on its other side to shaft 51 of roller 44 by lead 54. Welding contacts 45 on the electrodes formed by rollers 43 and 44 may be spaced circumferentially and axially to make spot welds 46 at each end of each flat surface 30, as shown on the core in FIGURE 2 or may be spaced closer axially along the flat surfaces 30, as illustrated in FIGURE 6, in which they are spaced by cut-away portions 47. As shown in FIGURE 7, the re-entrant portions 48 of the rollers 43 and 44 have a greater diameter than the semicircular surfaces 29 of the core so as to prevent contact except at the flat surfaces 30 which are being welded. As a result the welding circuit is closed only when a pair of flat surfaces 30 are in pressure relationship between a pair of welding contacts 45.

The present invention greatly increases the production rate in the forming of individual metal sheets and in the making of honeycomb core elements because of the ease with which the metal is moved and formed in the rollers. In addition, the production costs are reduced because the radially displaceable male dies are relatively inexpensive to manufacture in comparison with one-piece rollers embodying fixed male die members thereon, and further because the displaceable dies do not damage the material being worked upon and have increased life.

While the particular honeycomb core and the method for making the same herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:
1. A continuous method of forming a unitary honeycomb core from two flat sheets of thin metal comprising feeding a first sheet of thin metal between a first set of mating circumferentially engaged male and female rollers, forcing elongated protrusions movably supported on said first male roller against said first sheet thereby forcing said first sheet into circumferentially-spaced re-entrant portions on said first female roller to form alternate raised and re-entrant portions on said first sheet, resiliently urging said protrusions radially outwardly on said first male roller feeding a second sheet of thin metal between a second set of circumferentially engaged male and female rollers, forcing elongated protrusions movably supported on said second male roller against said second sheet thereby forcing said second sheet into circumferentially-spaced re-entrant portions on said second female roller to form alternate raised and re-entrant portions on said second sheet, resiliently urging said protrusions radially outwardly on said second male roller moving the raised portions of said sheets of metal into contact with each other and joining said sheets together at said raised portions to form a unitary core with said re-entrant portions facing toward one another.

2. The method defined in claim 1 characterized in that said joining step includes the step of bonding said formed sheets together between substantially all juxtaposed surface areas of their said raised portions while other portions of said sheets are being formed.

3. The method defined in claim 1 characterized in that said joining step includes the step of mechanically tacking said formed sheets together along the opposite lateral edges thereof and between juxtaposed areas of contacting raised portions thereof while other portions of said sheets are being formed.

4. The method defined in claim 3 characterized in the step of applying a bonding agent to the raised portions of one of said formed sheets prior to tacking said formed sheets together.

5. The method defined in claim 4 characterized in the step of passing said tacked sheets through a heated zone while holding the juxtaposed raised portions thereof firmly together until said bonding agent has taken a set.

6. The method defined in claim 5 characterized in that said bonding agent comprises brazing compound.

7. The method defined in claim 1 characterized in passing said formed sheets into pressure contact with one another as respects the juxtaposed raised portions of said sheets and welding said raised portions together at a welding station while continuously advancing said continuous lengths of sheets past said welding station and between said pairs of male and female rollers.

8. The method defined in claim 7 characterized in that said female rollers are positioned in closely spaced parallel relation and such that formed sheeting produced by each passes therebetween after the formed sheeting has advanced past the associated one of said male rollers, and mechanically tacking said sheets together as the sheets pass between said female rollers.

9. The method defined in claim 8 characterized in that said mechanical tacking step comprises simultaneously forming small aligned protrusions in said sheets and forcing metal therefrom into mechanically interlocked engagement.

10. That method of making a reinforcing high-strength honeycomb core assembly for use in making honeycomb sandwich material which method comprises, advancing a flat strip of thin flexible sheet metal past a metal forming station and there progressively forming semi-cylindrical grooves transversely of said strip by pressing said strip against one-half side of a plurality of parallel cylindrical rods supported against a backing layer of resilient material, forming a narrow flat web of material between the adjacent lateral edges of said grooves which webs lie in a plane flush with the open sides of said grooves, similarly and simultaneously forming an identical strip of thin flexible material, applying a bonding agent to the said flat narrow webs connecting the adjacent edges of the semi-cylindrical grooves of the two strips, pressing the coated flat webs of the two strips together with the open sides of the grooves in each strip facing one another, and advancing said sheets continuously through a heated zone while holding said coated surfaces in pressure contact while said coating sets.

References Cited in the file of this patent

UNITED STATES PATENTS

| | | |
|---|---|---|
| 626,183 | Martin | May 30, 1899 |
| 1,641,809 | Guenthart | Sept. 6, 1927 |
| 2,258,858 | Meadowcroft | Oct. 14, 1941 |
| 2,423,870 | Blessing | July 15, 1947 |
| 2,731,713 | Schaefer | Jan. 24, 1956 |
| 2,816,355 | Herman | Dec. 17, 1957 |
| 2,843,722 | Wegeforth | July 15, 1958 |
| 2,851,133 | Steele | Sept. 9, 1958 |
| 2,905,123 | Dean | Sept. 22, 1959 |

FOREIGN PATENTS

| | | |
|---|---|---|
| 170,224 | Great Britain | Oct. 20, 1921 |
| 55,617 | Norway | June 7, 1937 |